Feb. 11, 1941.  J. E. BENNETT  2,230,990
MEASURING INSTRUMENT
Filed April 17, 1939
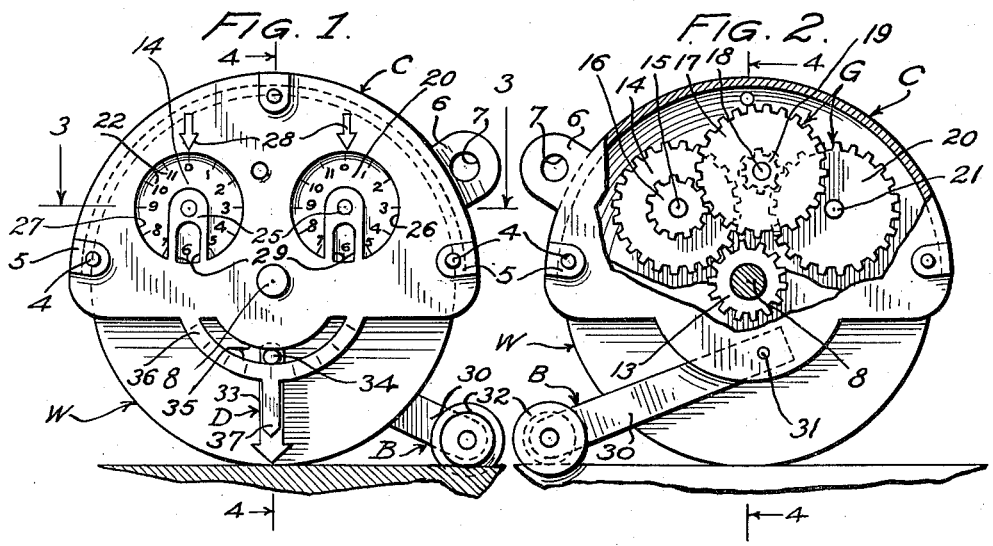
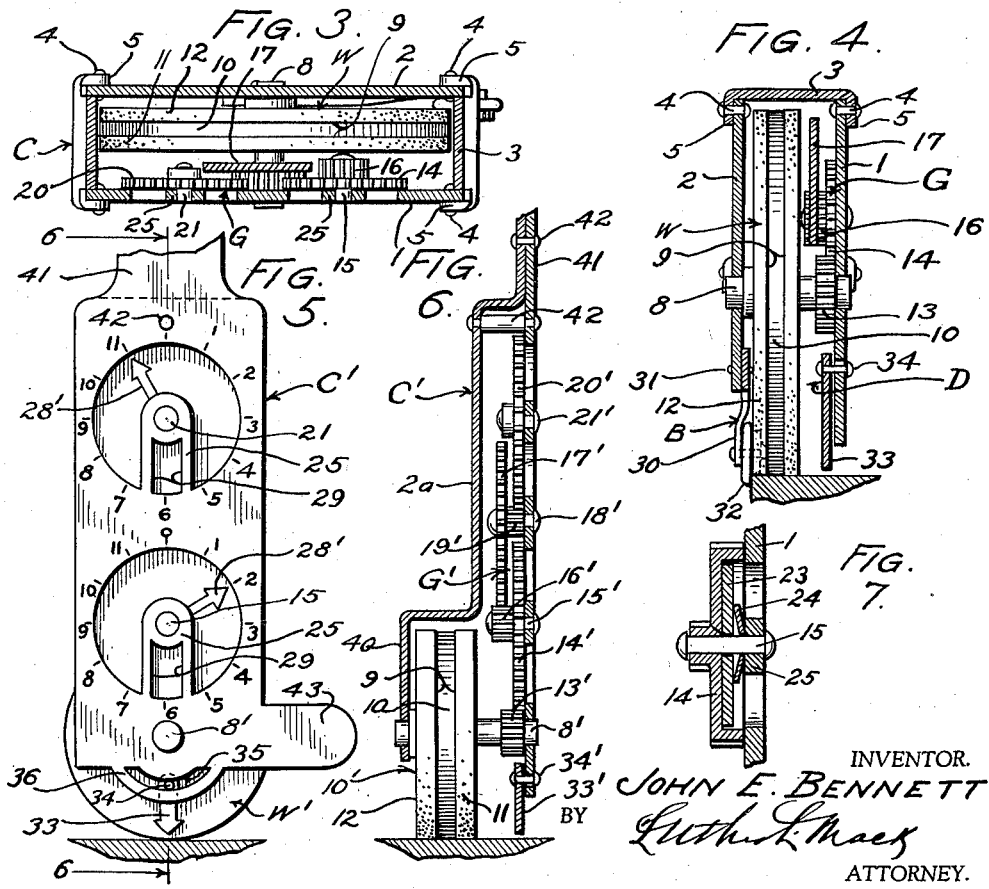
INVENTOR.
JOHN E. BENNETT
BY
ATTORNEY.

Patented Feb. 11, 1941

2,230,990

UNITED STATES PATENT OFFICE 2,230,990

MEASURING INSTRUMENT

John E. Bennett, Pasadena, Calif.

Application April 17, 1939, Serial No. 268,283

4 Claims. (Cl. 33—141)

This invention relates to and has for an object the provision of an improved and simplified measuring device adapted for various uses where substantially accurate measurements are desired. More particularly, I provide a measuring instrument which embodies as a primary element a traction wheel adapted to be moved over a surface to be measured, a driving means connected with and operated by said wheel, a case within which said wheel and driving means are mounted, and an indicating means operated by said driving means for indicating different units of measurement, such as for instance, feet and inches, or other units and fractions thereof.

It is another object to provide a measuring instrument having a wheel sufficiently large to insure accurate measurement and a case therefor which is but slightly larger than and will afford a convenient and accurate operation of the wheel, together with suitable means on the case for indicating the inclination of the case, if any, from a perpendicular line so as to enable an operator to set the instrument in a truly perpendicular position for use.

Another object is to provide a guide fixed to the case and arranged to engage marginal portions of the surfaces to be measured whereby the instrument may be caused to traverse a given line or path without undue attention on the part of the operator.

Other and more detailed objects of invention will appear as the description of my invention proceeds.

I have disclosed a preferred form of instrument embodying my improvements in the hereinafter following description of the structure and operation and particularly illustrated in the accompanying drawing, subject to modification, within the scope of the appended claims, without departing from the spirit of my invention.

In said drawing—

Figure 1 is a front elevation of my improved instrument shown in position for use in a measuring operation;

Figure 2 is a rear elevation of the same, partly broken away to show the internal mechanism;

Figure 3 is a sectional plan on line 3—3 of Figure 1;

Figure 4 is a sectional elevation on line 4—4 of Figure 1;

Figure 5 is a front elevation of a slightly modified form of instrument;

Figure 6 is a sectional elevation of the same on line 6—6 of Figure 5; and

Figure 7 is a fragmentary section on line 7—7 of Figure 1, showing certain details also applicable to the form of device shown in Figures 5 and 6.

Now, referring particularly to Figures 1 to 4, inclusive and Figure 7, it will be observed that the instrument broadly includes a measuring wheel W, a case C at least partially enclosing said wheel and forming a support therefor, a gear train G within the case and operatively connected with said wheel, a guide B and a level indicator D.

Case C is substantially semi-cylindrical and may be integrally formed of sheet or cast material, or, as shown, may be composed of a pair of axially spaced plates 1 and 2 forming, respectively, a front and a back for the case, and an arcuate member 3 forming a closure for the rim of the case and suitably affixed to the plates 1 and 2 as by means of rivets or screws 4 which extend through ears 5 bent from the member 3 and overlying or underlying the plates 1 and 2. One of the case members may be provided with an extension 6 having an aperture 7 to which a handle (not shown) may be attached for operating the instrument as when used for measuring floors or other surfaces.

Wheel W is rotatably supported on a spindle 8 which has its opposite end portions journalled in the front and back plates 1 and 2, respectively, and is peripherally provided with frictional bands 11 and 12, and an intermediate knurled or roughened rim portion 9 for affording traction and preventing slippage when the wheel is moved over a surface to be measured. The driving means including a gear train G having a driving pinion 13 fixed to shaft 8 adjacent front 1 and meshing with a larger gear 14 on a shaft 15, a pinion 16 fixed for rotation with gear 14 and meshing with a larger gear 17 on a shaft or stud 18, and a pinion 19 fixed for rotation with gear 17 and meshing with a gear 20 on a shaft or stud 21. The shafts or studs 15, 18, and 21 are mounted on one of the plates forming the front or back of the case C on plate 1 of the case as shown in the drawing.

Gears 14 and 20 are symmetrically positioned with respect to and are off-set from the axis of wheel W and may have graduations 22 on the front faces thereof, as shown in Figure 1 for indicating feet and inches, respectively, or other units of measurement, or, as shown in Figure 7, dials 23 may be interposed between said gears 14 and 21 and the supporting part of the case as at 1, on the front faces of which the graduations 22 may be shown. If the dials 23 are used, I prefer to employ friction washers 24 between the sides of the gears and portions 25 of member 1 for frictionally holding the dials for rotation with the associated gears but rendering it possible to move the dials independently of the gears as for the purpose of setting the dials to neutral position at the beginning of a measuring operation. In Figure 7, I have shown the dial 23 mounted in a recess of the gear 14 but I do not direct the structure to this form and arrangement. It will be noted that the shafts 15 and 21 carrying the gears 14 and 20, respectively, are supported on both members 1 and 2 by means of the bearing portions 25 which are stamped from the body of member 1 and extend upwardly into openings 26 and 27 in said member for rendering the dials of the instrument visible.

Member 1 may have arrows or marks 28, as shown in Figure 1, on the outer face of member 1 for indicating points of beginning in measuring operations, so that, as shown, the dials will be at zero or neutral points when in registration with the marks 28. The ratio between wheel W and gear dial 14 of course depends upon the circumference of said wheel, and the ratio between the two gear dials depends upon the ratio between the different units of measurement represented on the dials. Assuming that gear 14 and its dial are graduated and adapted to indicate inches while gear 20 and its dial is graduated and adapted to indicate feet of measurement, and, further assuming that the circumference of wheel W is exactly 6 inches, then two complete revolutions of the wheel will register twelve inches on the dial of gear 14 and one foot on the dial of gear 20, the ratio in such case between gears 14 and 20 being twelve to one. In any event, however, one inch of traverse on the periphery of wheel W will register "1" on the dial of gear 14, and one complete revolution of gear 14 will register "1" on the dial of gear 20.

The portions 25 of member 1 have apertures 29 formed at diametrically opposite points on the dials from the marks 28 through which the progress of measurements may be observed and noted. Wheel W being readily rotatable on the case C, and it being desirable to maintain the instrument in the erect position shown in Figures 1 and 2 during measuring operations, I provide a frictionally held guide B which includes a bar 30 pivoted to the back 2 of the case at 31 and having a flanged roller 32 on its outer end for engagement with the margins of surfaces to be measured so as to guide the instrument in a straight path as for instance along the edge of a table, strip of material or otherwise.

The instrument is capable of being levelled for use by visual indication as to its position or inclination, as by means of a gravity actuated indicator D having a depending pointer 33 which is pivotally held by means of a pin 34 freely seating in an arcuate slot 35 formed centrally in the lower extremity of the front member 1 of case C and preferably concentrically with the axis of wheel W, member 1 may be graduated in degrees on a portion thereof as at 36 adjacent slot 35 and member 1 may have a depending radial extension 37 which, when the instrument is truly vertical in position for use, will register with the pointer 33.

As the instrument is inclined from its normal vertical position (as shown), pointer 33 will always retain a truly vertical position, thus indicating the extent to which the instrument may be inclined at any time or under any conditions of use.

The foregoing description has been directed broadly to my improvements in general particulars but with certain major details of structure, and I will now describe the modified form of device shown in Figures 5 and 6, to which attention is called. In this modified form of instrument, case C' has front and back plates 1a and 2a, respectively, suitably secured together in spaced relation with the gear train G' and wheel W' mounted thereon and therebetween, but the form of the instrument is of generally rectangular design with the dials arranged one above the other as shown in Figure 5. Except as to their vertical rather than transverse relationship, as shown in Figure 2, the gear train G' is similar to the train G, gears 13', 14', 16', 17', 19', and 20' corresponding, respectively, to gears 13, 14, 16, 17, 19 and 20 of Figure 2; and shafts 8', 15', 18' and 21' corresponding, respectively, to shafts 8, 15, 18, and 21 of Figure 2.

Case C' is relatively shallow throughout a major portion of its length as compared with the bottom portion 40 of back member 2a which is bent outwardly and thence downwardly from its body so as to provide additional space for housing the wheel W', as shown in Figure 6. In this form of device the graduations may be on the gears or dials as in Figure 1 or on the outer face of the front member 1 as in Figure 6 and arrows or marks 28' may be formed on the gears or dials, as the case may be. Members 1a and 2a may be formed so as to provide a handle portion 41 at the top of the instrument and said members may be suitably secured together as by means of rivets or screws 42 at desired points. Member 1a may also have a lateral extension 43 which, when the instrument is tilted may engage a surface to be measured or an edge of a member having such surface, for guiding the operator and instrument in measuring operations. In this form of device if it is desirable and more convenient for operating the instrument to incline the same at a suitable angle, the graduations on or around the dials may be correspondingly arranged so that the neutral points will be in their proper positions instead of in positions for using the instrument in an upright position as shown.

In the use of either of the forms herein shown and described, it will be readily understood that the instrument may be set at neutral position for instituting a measuring operation by merely spinning the wheel W or W' until the dials register zero and thereafter as the wheel is moved over a surface to be measured the actual distance traversed will be accurately and automatically registered on the dials of gears 14 or 14' and 20 or 20', and the total distance capable of indication on the instrument dials may be increased or decreased or varied to meet different uses by varying the ratio between gears 14 and 20 and the relationship between the measuring wheel and gear 14.

The arrangement and form of the structure shown is extremely simple and of light weight. The case C is but slightly larger than the wheel W and is concentric therewith, and the indicating dials are symmetrically arranged in their offset portions from the axis of the wheel so as to present a satisfactory appearance. It will be obvious that more than a pair of dials may be employed so that more than two different units of measurement may be indicated by the dials. Also the wheel W may be provided on its outer side with graduations representing fractions of an inch or other basic units of measurement so that measurements may be more accurately read and determined.

The structure of case C is such that the three parts will be closely fitted together, the rim 3 being held between the front plate 1 and back plate 2 and serving to hold said plates in spaced relationship, while the ears 5 are bent outwardly over the plates 1 and 2 and riveted, screwed or welded together.

What I claim is:

1. A measuring instrument comprising: a case, a measuring wheel rotatable thereon, indicating means on said case arranged for visual indication of different units of measurement in the traverse of said wheel over a surface to be measured, said wheel being of substantially larger diameter than said indicating means, and means for operatively connecting said wheel with said indicating means, and a gravity actuated pendant indicator carried by said case and adapted to register with a portion of said case, a radially disposed member depending from said case and with which the indicator is adapted to align.

2. A measuring instrument comprising: a case, a measuring wheel rotatable thereon, plural indicating means on said case arranged for visual indication of different units of measurement in the traverse of said wheel over a surface to be measured, said wheel being of substantially larger diameter than either of said indicating means, and means for operatively connecting said wheel with said indicating means, and a gravity actuated pendant indicator carried by said case and depending therefrom, a radial member depending from said case for cooperation with the pendant indicator, and a guide frictionally held in adjusted position on said case and having a portion adapted to engage a marginal portion of surface to be measured, said guide cooperating with and for guiding the instrument during the operation thereof.

3. A measuring instrument comprising: a case, a measuring wheel rotatably mounted in and extending from the bottom of said case, indicating means in said case including a plurality of rotatable dials visible through openings in said case for indicating measurements made by the traverse of said wheel over a surface in different units of measurement, driving means operatively connecting said wheel with said dials, said wheel being of substantially larger diameter than said dials, and an inclination indicator carried and depending from the lower edge of said case.

4. A measuring instrument comprising: a case, a measuring wheel rotatably mounted in and extending from the bottom of said case, indicating means in said case including a plurality of rotatable dials visible through openings in said case for indicating measurements made by the traverse of said wheel over a surface in different units of measurement, driving means operatively connecting said wheel being of substantially larger diameter than said dials, said case having a depending extension disposed radially from the axis of said wheel, and an inclination indicator pivotally held on and depending from a lower edge of said case for registration with said extension.

JOHN E. BENNETT.